United States Patent [19]

Goodlaxson

[11] Patent Number: 4,554,037

[45] Date of Patent: Nov. 19, 1985

[54] CORN POPPING MACHINE AND METHOD OF ASSEMBLING THE SAME

[76] Inventor: James M. Goodlaxson, 705 E. 20th St. South, Newton, Iowa 50208

[21] Appl. No.: 618,879

[22] Filed: Jun. 8, 1984

Related U.S. Application Data

[62] Division of Ser. No. 486,263, Apr. 18, 1983.

[51] Int. Cl.⁴ .............................................. A23L 1/18
[52] U.S. Cl. .................................. 156/152; 156/160; 156/293; 156/305; 29/460
[58] Field of Search ............... 156/160, 152, 293-294, 156/305, 165; 29/460, 469.5, 468

[56] References Cited

U.S. PATENT DOCUMENTS

| | | | |
|---|---|---|---|
| 3,005,741 | 10/1961 | Hallas | 156/152 |
| 3,665,839 | 5/1972 | Gottlieb | 99/323.5 |
| 4,304,038 | 12/1981 | Yabu | 29/469.5 X |
| 4,443,282 | 4/1984 | Stachitas | 156/152 |

*Primary Examiner*—David Simmons
*Attorney, Agent, or Firm*—Zarley, McKee, Thomte, Voorhees & Sease

[57] ABSTRACT

A corn popping machine and method of assembling the same for the popping, storing and displaying of popcorn, which includes a three-sided panel member of a generally U-shape forming three side walls to the popping machine. A top chassis plate is secured to the top edge of the panel member by securing means and includes means for attachment of corn popping equipment and electrical connecting and controls. The lower edge of the panel member is secured to a base member having channels to matingly retain the lower edges of the panel member. Doors are attached to the corn popping machine and cover the vertical opening between ends of the U-shaped panel. The method of assembling the corn popping machine includes the steps of attaching the top chassis member and the base member to the top and bottom edges of the panel member respectively. The doors are then secured to the machine and the stable, fully enclosed popcorn holding chamber is formed utilizing the three-sided panel to present an unobstructed viewing area to the interior of the machine.

6 Claims, 12 Drawing Figures

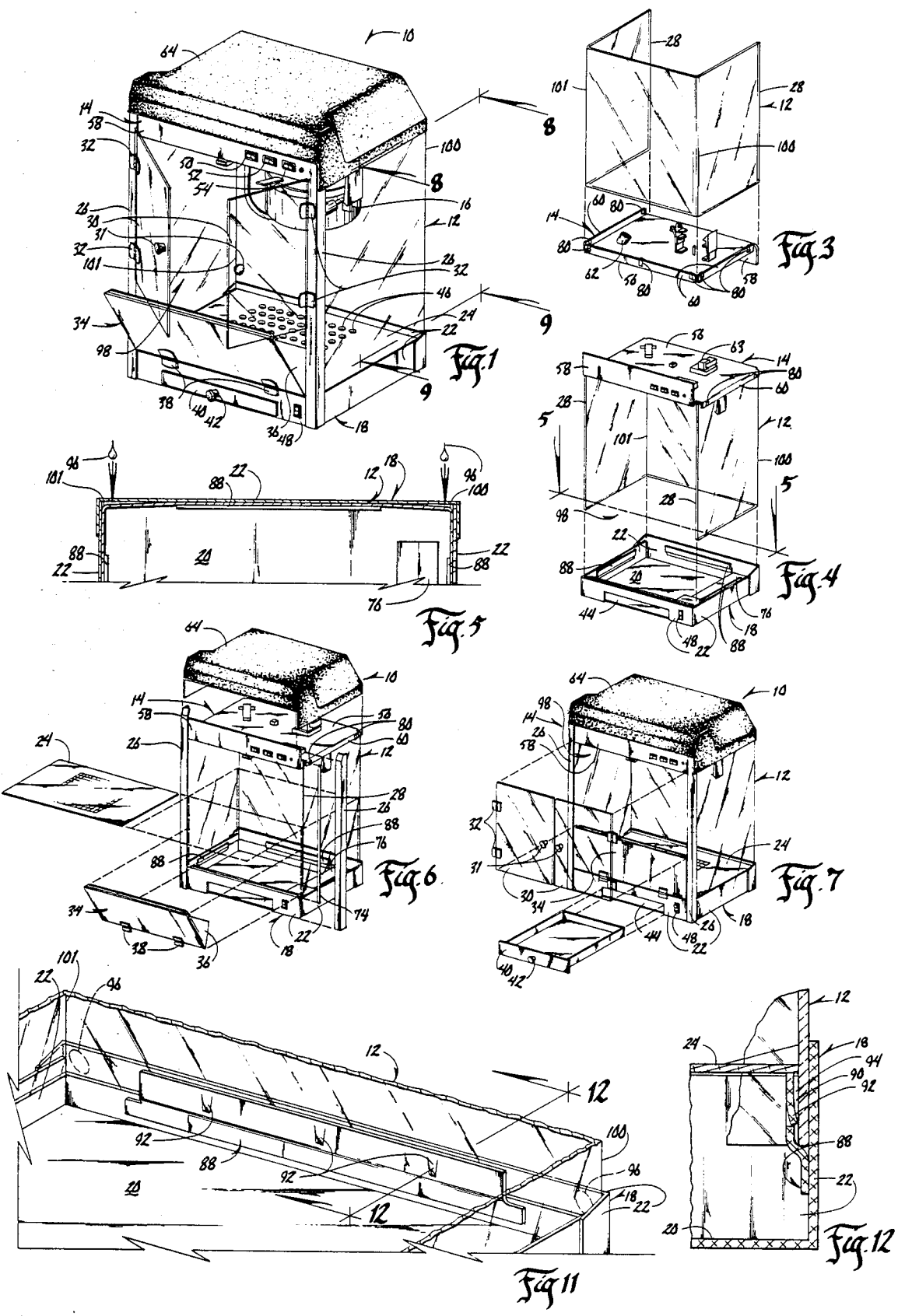

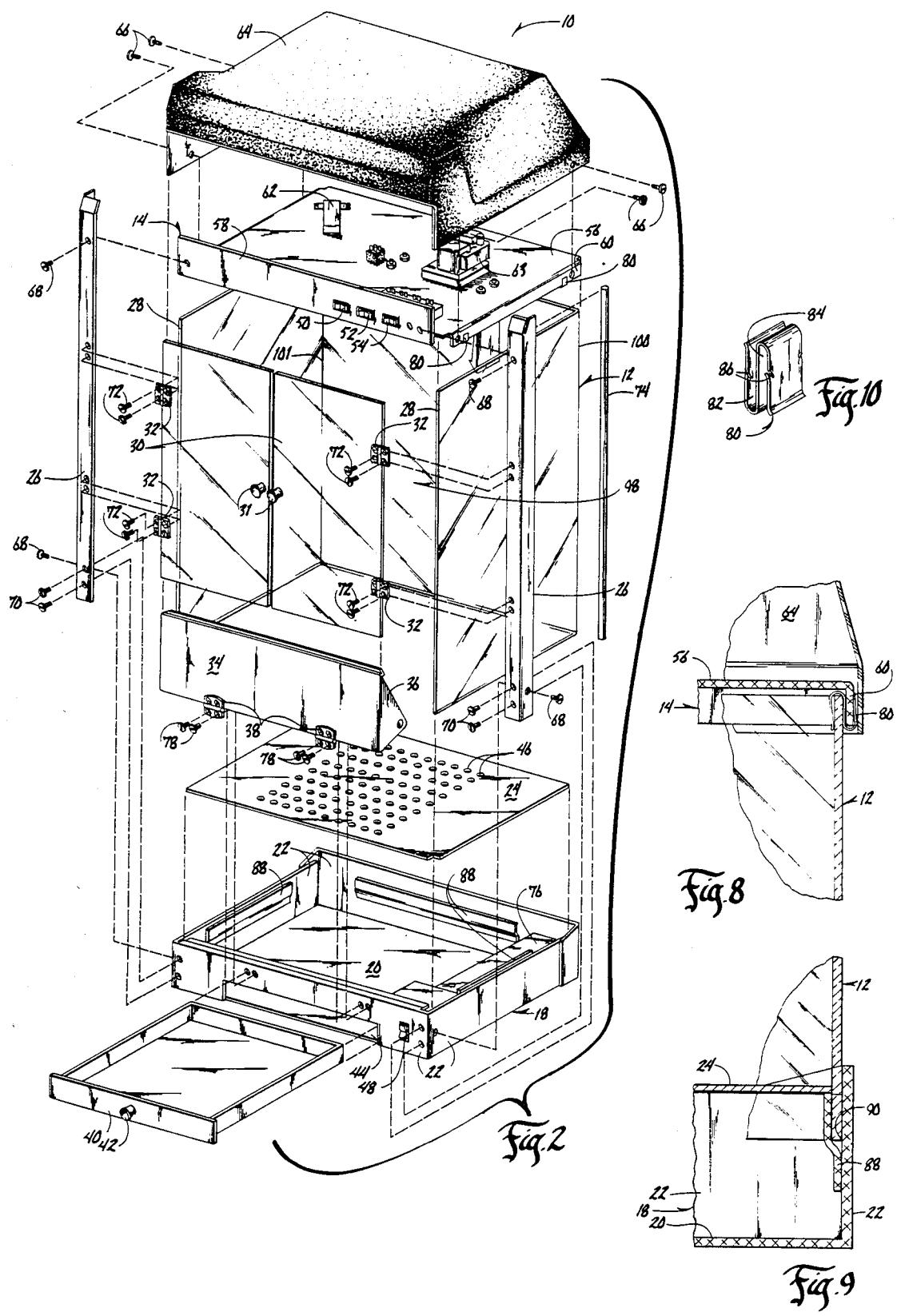

CORN POPPING MACHINE AND METHOD OF ASSEMBLING THE SAME

This is a division of application Ser. No. 486,263, filed Apr. 18, 1983.

BACKGROUND OF THE INVENTION

This invention relates to corn popping machines, and more particularly, to corn popping machines having chambers for the storage and display of popcorn and methods of assembling the same.

Commercial corn popping machines generally have a large holding chamber wherein popcorn can be stored and displayed. It is most desirable to have a container which is sturdy and durable, while at the same time allowing easy and full display of the contents of the container. This also applies to devices having similar cabinets, such as medical test machines, lab test machines, corn warmers, and incubators, to name a few.

Conventional devices utilize four corner posts with transparent plate members being mounted inbetween those posts. In many of these conventional four post devices, the posts were bolted at the top to a chassis plate and at the bottom to a base and the glass panes were trapped in slots between the chassis plate and the base. This construction permitted looseness and shifting of the glass within the limits of the slots and presented an inherent lack of rigidity. The four post construction also somewhat limited the viewing access of the interior of the device.

Another method of constructing conventional four post devices would be to bolt the glass panes directly to top and bottom mounting flanges through holes in the glass. The inherent problem with this design is that it was susceptible to weakness and breakage or cracking along the edge of the glass where the holes are positioned. This is a particularly significant disadvantage if the device is used for storing food items because the possibility of pieces of the glass panes breaking and falling into the food exists.

All four post constructions limit the viewing access to the container and also are much more susceptible to distortion and disalignment if impacted during use or in shipment which would bring the machine out of squareness and result in an appearance of careless assembly and unit weakness.

Attempts have been made at utilizing a three-sided contiguous glass sheet to increase viewing access and rigidity. This construction eliminates two posts but has the weakness in that although the remaining two posts were attached to top chassis and bottom base member, the remaining three sides of the glass panel are merely trapped between the top chassis and bottom plate. Therefore, although the rear two ports provide some measure of rigidity in that area, any pulling action away from the two posts makes the machine susceptible to separation of the glass from the top chassis and from the bottom base member. If bolting of the glass pane is contemplated, again the risk of glass breakage is created. The problem is particularly acute when the machine is lifted by its top chassis plate which frequently results in separation of the glass from the channel in which it is positioned.

Therefore, it is an object of this invention to provide a corn popping machine and method of assembling the same which improves upon the aforementioned deficiencies in the art.

A further object of this invention is to provide a corn popping machine and method of assembling the same which results in a structure which is rigid and durable, even when impacted, and at the same time provides for increased visibility of the interior of the device.

Another object of the invention is to provide a corn popping machine and method of assembling the same which utilizes a contiguous three-sided panel to form three walls of the machine.

A further object of this invention is to provide a corn popping machine and method of assembling the same which does not utilize any bolts or securing devices which require modification of the glass.

A further object of this invention is to provide a corn popping machine and method of assembling the same which is sturdy, durable, economical and efficient.

These and other objects, features and advantages of the invention will become apparent with respect to the accompanying specification and drawings.

SUMMARY OF THE INVENTION

This invention utilizes a contiguous three-sided transparent panel which is rigidly secured between a top chassis plate and a base. The method of securement holds the panel in place without requiring holes to be drilled into the panel which would create stress concentrations which would make the panel more susceptible to breakage. On the other hand, the method of securement insures that all sides of the panels will remain rigidly in place so that separation of the panel from either the top chassis or the base is not allowed.

The top edge of the panel is secured to the top chassis by clip members which attach first to the top chassis plate and then to the panel member and hold them retentively together. The bottom of the panel is secured to the base by placing the panel's bottom edge into channel members, flexing the corners of the panel, and then inserting glue between the panel and the base and releasing the panel so that the glue binds the two together. Additionally, two corner posts are attached between the top chassis plate and the base member at the ends of the panel member to retentively trap the panel between the top chassis plate and the base.

Doors are hingably attached to the corner posts and base member to complete the enclosure for holding popcorn, and popcorn making apparatus is then included with electronic controls. To complete the machine, additional features such as light bulbs, heating elements, grate member and an old maid drawer can be added. A hood cover which attaches to the top chassis plate can also be included to increase the aesthetic appearance of the machine.

The three-sided panel and its method of assembly enhances the appearance of the machine, reduces the cost of construction and improves vision into the chamber of the machine. These advantages are all accomplished while maintaining a structural strength and rigidity which is necessary for its purposes.

BRIEF DESCRIPTION OF THE DRAWINGS

FIG. 1 is a perspective view of the invention.

FIG. 2 is an exploded perspective view of the invention.

FIGS. 3-7 are perspective views showing various stages of assembly of the invention.

FIG. 8 is a sectional view taken along line 8—8 of FIG. 1.

FIG. 9 is a sectional view taken along line 9—9 of FIG. 1.

FIG. 10 is a perspective view of sheet metal clip which can be used for attachment of the top chassis plate to the panel member.

FIG. 11 is a partial perspective view of the base of the invention.

FIG. 12 is a partial sectional view taken along line 12—12 of FIG. 11.

DETAILED DESCRIPTION OF THE PREFERRED EMBODIMENT

In reference to the drawings, and particularly FIG. 1, there is shown a corn popping machine 10 in accordance with the invention. A three sided contiguous integrated panel member 12 forms three vertical sides of the invention 10. A top chassis plate 14 is secured to the top edge of panel member 12 and serves as a top cover and support for the popcorn making equipment 16. A base member 18 attaches to the bottom edge of panel member 12 to form the bottom of the invention 10. Base member 18, in the preferred embodiment is made up of a rectangular horizontal floor piece 20 (seen in FIG. 2), and vertical side walls 22 extending from the perimeter edges of floor piece 20. A grate member 24 is placed inside the chamber defined by top chassis plate 14, base member 18 and panel member 12 and is spaced above floor piece 20. Corner posts 26 are secured between top chassis plate 14 and base member 18 at the vertical edges of ends 28 of contiguous panel member 12. Transparent doors 30 having handles 31 are attached by hinges 32 to corner posts 26 and are hingable from a closed position across the side defined by corner posts 26, top chassis plate 14 and base member 18 (see FIG. 2) to an open position. Drop-down door 34 having side panels 36 extending perpendicularly from the side edges of drop-down door 34 is attached to base member 18 by hinges 38 and is hingable from a closed position in the same general plane as corner posts 26 to an open position acutely formed with center posts 26 (as shown in FIG. 1). Drawer 40 with handle 42 is slidably engagable into drawer slot 44 (see FIG. 2) and is aligned beneath grate openings 46 in grate member 24. Drawer 40 facilitates the removal of seeds and debris following grate openings 46. Rocker switch 48 in base member 18 and rocker switches 50, 52 and 54 in top chassis plate 14 are control switches for various operations of the popcorn making equipment 16 and for such other devices such as a light and a warmer (FIGS. 2 and 4).

FIG. 2 shows in more detail the exact structural elements of the invention 10. Panel member 12 and doors 30 can be stressed glass, where the glass is stressed only in tension or compression with little if any twisting moment. The glass material consists of preferrably acrylic, polycarbonate or similar durable, clear plastic.

Top chassis plate 14 has a basically rectangular horizontal surface 56 with a vertical plate 58 having a portion extending beneath surface 56 and a portion extending above surface 56 and downward extending rims 60 on the three other sides corresponding to the three sides of panel member 12. Vertical plate 58 contains rocker switches 50, 52 and 54 which control such functions such as the heat to popcorn making equipment 16 (shown in FIG. 1), power to light socket 62 and power to a rotary motor 63 which operates a stirrer mechanism in popcorn making equipment 16. It is to be understood that other switches and equipment can be operated with additional switches from vertical plate 58. A top hood covering 64 is attachable over top chassis plate 14 by bolts 66 into rims 60. Top hood covering 64 serves to cover and protect top chassis panel and any equipment associated with it and also presents an aesthetically pleasing top for the invention 10.

Top hood covering 64 has downward extending edges which cover the downward extending rim 60 of top chassis panel 14 to additionally enhance the appearance of the machine. By referring to FIG. 8, this exact structural relationship can be seen.

Corner posts 26 can be made of any rigid material and are attached at their tops to top chassis plate 14 by bolts 68 and at the bottom to base member 18 by bolts 70. Hinges 32 are in turn attached to corner posts 26 by bolts 72. A hollow tube 74 can be inserted inside of a corner post 26 to run vertically from base member 18 to top chassis plate 14. Tube 74 functions to be a conduit for electrical wiring from an outside power source entering into base member 18 and extending through said conduit tube 74 to top chassis plate 14 to power said popcorn making equipment. It should be noted that the invention 10 can include a heating element 76 operated by rocker switch 50 in base member 18 for heating popcorn which is stored and displayed in the invention 10. It should also be noted that the light bulb (not shown) operated from socket 62 also serves to warm the popcorn.

Drop-down door 34 is hingably attached to base member 18 by hinges 38 and bolts 78. Triangular shaped side panels 36 on both sides of hingable wall 34 combine to act as a tiltable retaining wall for popcorn while allowing better access to the popcorn holding chamber.

By referring now to FIGS. 3-7, the method of assembling the invention 10 can be described. FIG. 3 shows top chassis plate 14 and panel member 12 in an inverted position with sheet metal clips 80 positioned around rims 60 of top chassis plate 14. Sheet metal clips or Tinnerman clips 80 can be more distinctly seen in FIG. 10. Clips 80 consist of sheet metal bent into an S-shape defining a first channel 82 and a second channel 84. Additionally, barbs 86 can be stamped from the clips so they extend into the channels and bite and retain any object inserted into either channel 82 or 84. In FIG. 3, channel 84 of clips 80 has been inserted over rims 60 and retentively is held there. Panel member 12 is then inserted into channels 82 of clips 80, with the perimeter of top chassis plate 14 being slightly larger than the perimeter of the top edge of panel member 12 so that the top edge of panel member 12 fits inside of rims 60 of top chassis plate 14 into channels 82 of clips 80.

Once top chassis plate 14 is secured to panel member 12 by clips 80, FIG. 4 shows that panel member 12 is then uprighted and inserted into base member 18 by placing the bottom edge of panel member 12 into the channel members 88 which are distributed along the inside walls 22 of base member 18. Channel members 88 are elongated pieces being bent generally in their middle so that their upper halves are spaced away from side walls 22 whereas their lower halves are abuttingly secured against side walls 22. As can be seen in FIG. 12, a channel 90 is formed by channel members 88 which is of such configuration to receive an edge of panel member 12. As with clips 80, channel members 88 can contain barbs 92 which are stamped out of the upper half of channel members 88 and extend into channels 90 so that once panel member 12 is inserted it grabs and retains that side of panel member 12 in channel 90.

Channel members 88 are generally centered along each side wall 22 of base member 18 corresponding with each side of panel member 12, but do not extend completely across side walls 22. By referring to FIG. 5, it can be seen that panel member 12 is permanently secured in channels 90 by flexing corners 100 and 101 of panel member 12 inwardly to create gaps 94 between panel member 12 and side wall 22. Adhesive, designated by the droplets and reference numeral 96 are then placed between panel member 12 and side wall 22 in gaps 94 and then flexed panel member 12 is released to again abut side wall 22 and allow the adhesive to permanently retain it against side wall 22.

It is to be understood that alternatively, stamped-out barbs 86 in channel members 88 could be relied on to secure panel member 12 within channels 88 without gluing.

The next step of assembly is shown at FIG. 6. Corner posts 26 are attached to top chassis plate 14 at their top ends and base member 18 at their bottom ends with conduit tube 74 being first placed inside of the right hand corner post 26. Grate member 24 is then inserted inside of the chamber 98 defined by panel member 12, top chassis plate 14, and base member 18. As can be seen in FIG. 12, grate member 24 is supported at its four sides by channel members 88. Top hood covering 64 is then secured to top chassis panel 14 and drop-down door 34 is secured to base member 18.

The final steps of assembly consist of the hingable attaching of doors 30 to corner posts 26 and the insertion of drawer 40 into drawer opening 44 of base member 18, as shown in FIG. 7. Corn popping machine 10 is thus assembled except for the popcorn making equipment 16 and any electrical wiring required and thus presents a three-sided transparent panel member 12 which is rigidly and securely attached to top chassis plate 14 and base member 18 to present a durable and rigid unit which is not susceptible to deformation or pulling apart and also presents better visual access to chamber 98.

FIG. 8 shows the exact configuration of panel member 12 and top chassis plate 14 as attached by clips 80. Furthermore, top hood covering 64 is shown in its position, covering top chassis plate 14 and clips 80.

FIG. 9 shows in detail the structural cooperation of panel member 12 with channel members 88 and side walls 22 of base member 18. FIGS. 11 and 12 show channel members 88 with barbs 86 and their cooperation for holding panel member 12 to base member 18. Additionally, the location of adhesive 96 between side walls 22 and panel member 12 is shown by dashed lines in FIG. 11. It is to be understood that the above description is that of the preferred embodiment of the invention only and that changes and modifications can be made to the invention while staying within the boundaries of the invention.

Thus, it can be seen that the invention achieves at least all of its stated objectives.

What is claimed is:

1. A method of assembling a corn popping machine having a vertically standing, three-sided, U-shaped transparent panel member having first, second and third sides with said first and third sides integrally forming corners with opposite edges of said second side, a top chassis plate assembly, a bottom base member and door means across the vertical open side of the panel means, the steps of the method comprising:
    (a) attaching said top chassis plate to the top edge of the panel member utilizing securing means which retentively hold and grasp said top chassis plate to said top edge of said panel member;
    (b) placing each edge of each side of said lower edge of said panel member into channel members secured to said base member, said channel members being of a length shorter than the width of each side of said panel member;
    (c) flexing the outer corners of said second side of said panel member so as to produce a small gap between the outer edges of said second side and said base member outwardly of said channel member;
    (d) inserting an adhesive substance between said flexed outer edges and said base member; and
    (e) releasing said flexed sides after said adhesive substance has been inserted so that said edges return to an abutting position against said base and are secured by said adhesive substance.

2. The method of claim 1 comprising the further steps of adding vertical support posts at the ends of said panel member between said top chassis plate and said base member and including a wiring harness inside of one of said vertical support posts.

3. The method of claim 1 comprising the further step of hingably attaching door means to said machine to cover the vertical opening between vertical ends of said panel members.

4. The method of claim 1 comprising the further step of adding a grate member on top of said base member after assembling said panel member to said base member.

5. The method of claim 1 wherein said securing means for said top chassis plate comprise sheet metal clips of a general S shape having a downward facing channel and an upward facing channel, said downward facing channel receiving a side of said panel members, said upper facing receiving said top chassis plate.

6. The method of claim 1 wherein said base member is rectangular, having a flat horizontal floor and vertical side walls extending upwardly from said floor, each of said upwardly extending side walls having a said channel member attached to its interior surface.

* * * * *